United States Patent [19]
Lawson

[11] Patent Number: 5,654,875
[45] Date of Patent: Aug. 5, 1997

[54] ISOLATOR MOUNTING SYSTEM FOR SMALL FORM FACTOR HARD DISK DRIVE

[76] Inventor: Drew Brent Lawson, 18526 Vina Dr., Los Gatos, Calif. 95030

[21] Appl. No.: 690,437

[22] Filed: Jul. 26, 1996

[51] Int. Cl.⁶ .............................. H05K 7/14; G06F 1/16
[52] U.S. Cl. .................................... 361/685; 248/638
[58] Field of Search ........................... 248/560, 564, 248/581, 609, 615, 632, 634, 638; 360/97.01, 97.02; 361/684, 685; 364/708.1

[56] References Cited

U.S. PATENT DOCUMENTS

| | | |
|---|---|---|
| 4,260,208 | 4/1981 | Ho et al. . |
| 4,683,520 | 7/1987 | Grassens et al. . |
| 4,713,714 | 12/1987 | Gatti et al. . |
| 5,004,207 | 4/1991 | Ishikawa et al. . |
| 5,333,098 | 7/1994 | DeLuca et al. . |
| 5,337,998 | 8/1994 | Nemoto . |
| 5,349,486 | 9/1994 | Sugimoto et al. . |
| 5,402,308 | 3/1995 | Koyanagi et al. ............ 361/685 |
| 5,463,527 | 10/1995 | Hager et al. . |
| 5,469,311 | 11/1995 | Nishida et al. . |
| 5,491,608 | 2/1996 | Koyanagi et al. ............ 361/685 |
| 5,535,092 | 7/1996 | Bang ........................... 361/685 |
| 5,548,480 | 8/1996 | Rudi et al. ................... 361/685 |

FOREIGN PATENT DOCUMENTS

| | | |
|---|---|---|
| 58-98801(A) | 6/1983 | Japan . |
| 3-1391(A) | 1/1991 | Japan . |
| 3-104079(A) | 5/1991 | Japan . |
| 5-28736(A) | 7/1991 | Japan . |

*Primary Examiner*—Leo P. Picard
*Assistant Examiner*—Lynn D. Feild
*Attorney, Agent, or Firm*—Noreen A. Krall; James E. Bradley; Andrew J. Dillon

[57] ABSTRACT

A disk drive has an improved vibration isolator mounting apparatus for dampening the impacts and vibrations applied to the body of a computer while occupying only a minimal amount of space in the disk drive. The disk drive generally includes a magnetic disk drive mechanism enclosed by a disk drive enclosure, with an electronic card physically connected to the enclosure that electrically connects the disk drive to other components of the computer. Two sides of the disk drive enclosure extend beyond the top face of the disk drive enclosure to form two enclosure skirts. A vibration isolator mounting apparatus is mounted to each enclosure skirt. Each vibration isolator mounting apparatus has a flat, thin flexible strip overlying the free edge of the enclosure skirt with several retaining tabs depending downward from opposite sides of the strip. Some of the retaining tabs have spring clips extending into recesses formed in the enclosure skirt, thereby allowing the vibration isolator to be slid onto the enclosure skirt, but preventing its removal from the skirt. Each strip has two apertures, each aperture securing a mounting nut for attaching the strip to an external frame connected to the body of the computer, and each aperture being located over a corresponding slot formed in the enclosure skirt. A dampening member formed of elastomeric dampening material is bonded to the bottom of each mounting nut such that the dampening member is located in the slot and contacts the top face of the disk drive enclosure. The dampening members isolate the disk drive from mechanical vibrations and impacts applied to the body of the computer.

10 Claims, 3 Drawing Sheets

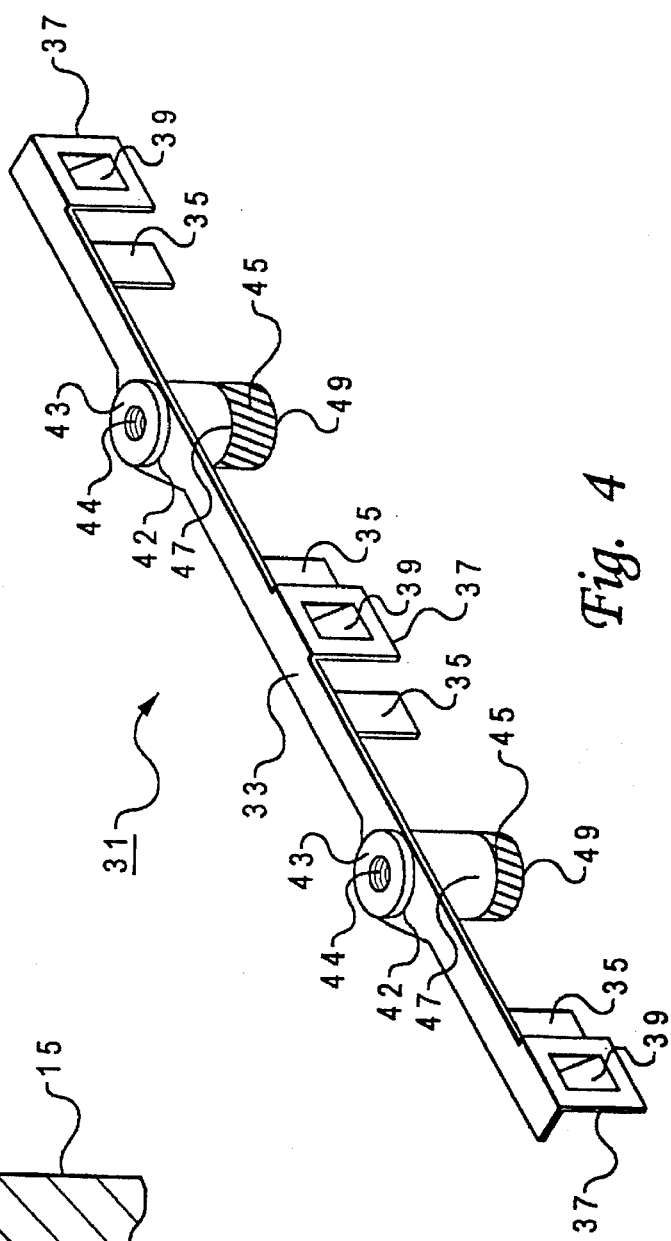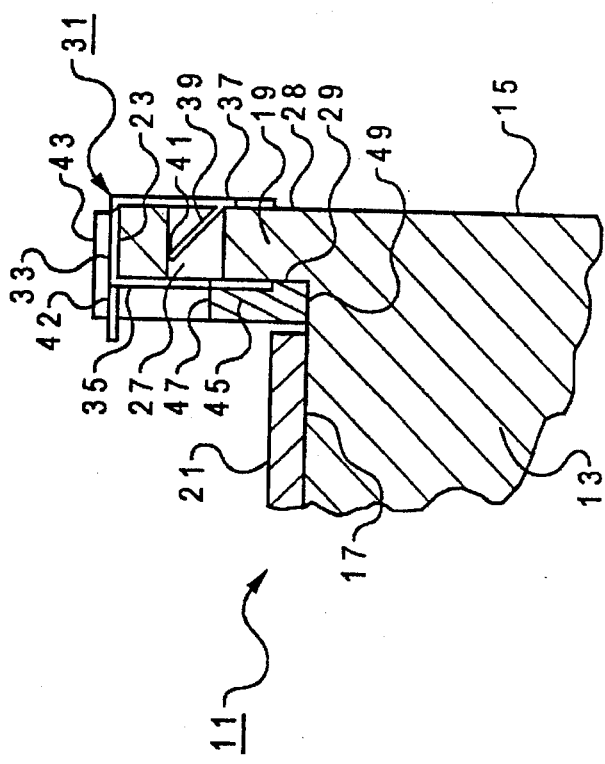

ISOLATOR MOUNTING SYSTEM FOR SMALL FORM FACTOR HARD DISK DRIVE

BACKGROUND OF THE INVENTION

1. Technical Field

The present invention relates generally to computer memory storage systems and, more particularly, to a vibration isolator mounting apparatus for computer hard disk storage.

2. Description of the Related Art

Modern computer hard disk drives are required to operate while subjected to various mechanical vibrations and impact loads. These vibrations and impacts are created not only from general handling and storage of the computer, but also during operation of the computer as a result of the various motors and other moving parts within the computer. Most hard disk drives employ several magnetic disks for storing information and one or more read/write heads to transfer information to and from each magnetic disk. When vibrations and impacts are transferred to the magnetic disk and read/write head, the head will be displaced from the proper position or track on the disk and errors will occur. Accordingly, these loads must be dampened and absorbed such that the movement of the disk drive is partially isolated from the movement of the other components of the disk drive in order to prevent poor performance and potential damages to the disk drive.

Further complicating matters is the fact that computers, including hard disk drives, have become progressively smaller and more portable in recent years. As computers become more portable, increased data storage capacity must be compressed into ever smaller physical spaces. The size of hard drives has now become relatively standardized and therefore any isolator system must fit within the specified standard form factor of the specific drive type. However, the need for increased data storage capacity has resulted in such high packaging density of the mechanical and electronic components that most drives do not have adequate room to "design in" isolators without exceeding this form factor. In addition, portable computers are subjected to more extreme vibrations and impacts than traditional computers and experience them more often. The result of this combination of harsh conditions and decreased space is a desperate need for isolation systems that dampen mechanical vibrations and impacts effectively while occupying a very small amount of space.

In the past, spring suspension systems have been used to isolate the disk drive from the source of the impact or vibration. However, these systems took up a significant amount of space because of the spring travel required for proper operation. With disk space at such a premium, this wasted space is no longer acceptable.

Another known method of isolating the movement of the disk drive is to use energy absorbing elastomers. However, many of the prior inventions using these elastomers simply formed this dampening material into resilient feet or grommets and located them at the corners of a rigidly mounted disk drive. Other known techniques form the dampening material into a washer-type shape that acts as a buffer between the external components and the disk drive and is secured in place by a bolt or some other appropriate connector. Although these methods are relatively effective at isolating the movement of the disk drive, each still takes up valuable space that could be more efficiently utilized by additional magnetic disks for increasing the information storage capacity.

SUMMARY OF THE INVENTION

The present invention is an improved isolator mounting system for computer hard disk drives. The primary object of this invention is to provide the necessary mechanical vibration and impact isolation of the hard disk drive relative to the rest of the computer while occupying a very small amount of physical space. A further object of this invention is to provide an isolator mounting system that is easily manufactured and simplifies disk drive assembly.

In one embodiment of the present invention, the disk drive assembly comprises a magnetic disk drive mechanism enclosed by a disk drive enclosure with two opposing side walls extending beyond the top face of the enclosure to form two enclosure skirts or rails. In use, the disk drive is installed inverted from the orientation in FIG. 1, such that the top face in this description actually faces downward. An electronic card for electrically connecting the disk drive to other components of the computer is mounted to the top face between the enclosure skirts. Finally, a vibration isolator mounting apparatus is secured to each enclosure skirt for dampening the mechanical vibrations and impacts experienced by the computer and disk drive.

Each vibration isolator mounting apparatus comprises a strip overlying a free edge of the enclosure skirt with several retaining tabs depending downward from opposite sides of the strip. The retaining tabs on opposite sides of the strip are staggered relative to each other to simplify fabrication of the strip. These retaining tabs position the strip horizontally on the enclosure skirt. Furthermore, some of the retaining tabs have spring clips, each extending into a corresponding recess formed in the enclosure skirt. The interaction of the spring clips and the recesses allows the vibration isolator mounting apparatus to slide onto the enclosure skirt, but then prevents it from sliding back off of the skirt, thereby positioning the strip horizontally and vertically. Two threaded mounting nuts are also secured to each strip for attaching the strip and thus the disk drive to an external frame connected to the body of the computer. Finally, a cylindrically shaped piece of dampening material is bonded to the lower portion of each mounting nut. Each mounting nut and dampening member combination is located within a slot formed in the enclosure skirt such that the lower portion of the dampening member contacts the top face of the disk drive enclosure. As a result, the movement of the disk drive is dampened and isolated relative to the vibrations and impacts applied to the body of the computer.

BRIEF DESCRIPTION OF THE DRAWINGS

FIG. 3 is an enlarged, partial sectional view of the vibration isolator and computer hard disk drive shown in FIG. 1, taken along line III—III of FIG. 2.

FIG. 4 is a perspective view of the vibration isolator shown in FIG. 1.

DETAILED DESCRIPTION OF PREFERRED EMBODIMENT

Figure 1:
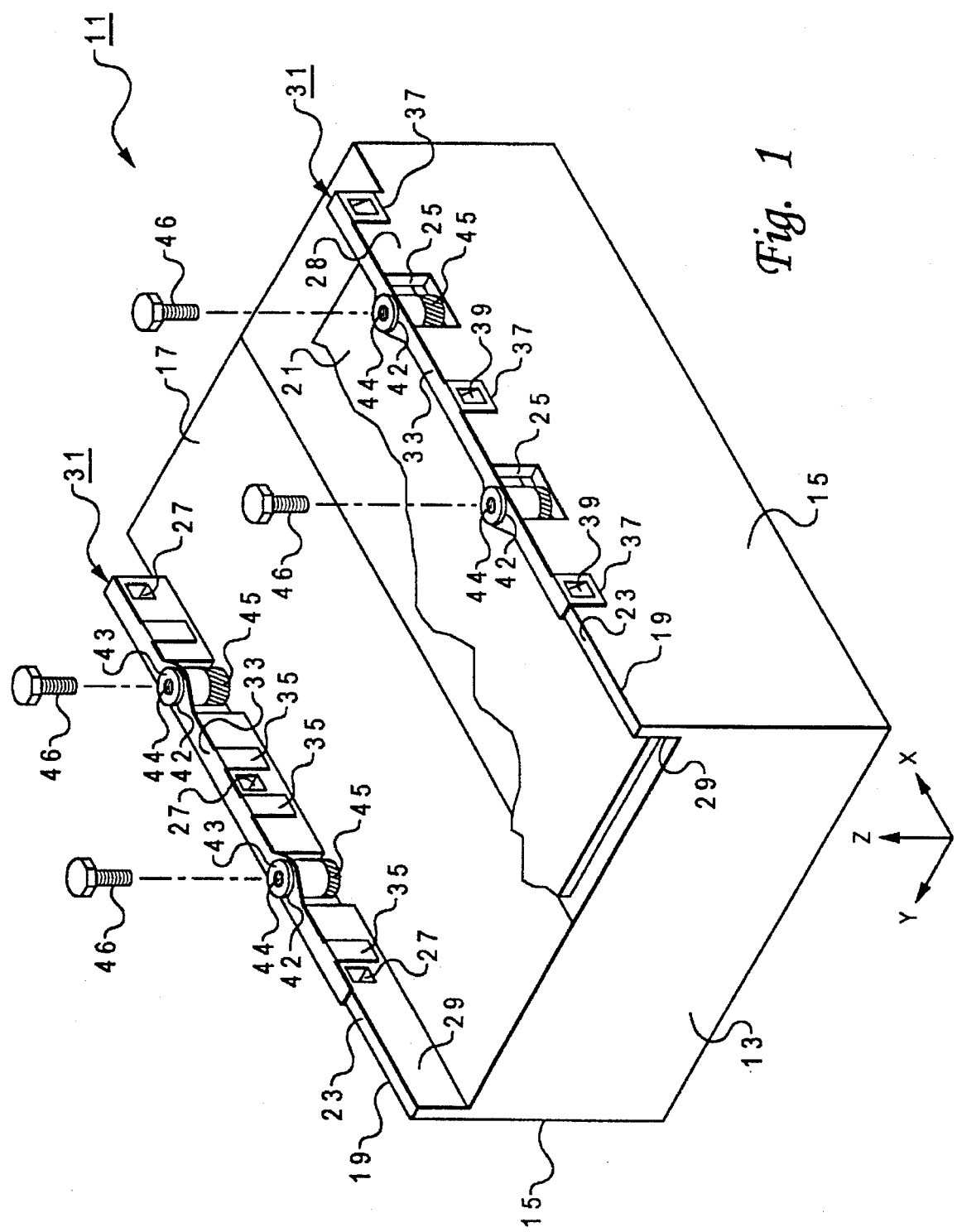
FIG. 1 is a partial perspective view of a vibration isolator of the present invention mounted on a computer hard disk drive.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

In FIG. 1, a conventional hard disk memory storage system or disk drive 11 is shown. A magnetic disk mechanism (not shown) for reading writing information to magnetic disks (not shown) is enclosed by a disk drive enclosure 13. Disk drive enclosure 13 has two parallel side walls 15 oriented in an X-Z plane and a top face 17 oriented in an X-Y plane. Note that the surface designated as top face 17 in this description is actually facing downward when disk drive 11 is installed. Each side wall 15 extends beyond top face 17 a short distance to form two enclosure skirts 19. An electronic card 21 is attached to the top face 17 of disk drive enclosure 13 and is positioned between the two enclosure skirts 19. Electronic card 21 has an electronic connector (not shown) at one edge for electrically connecting disk drive 11 to other components of the computer. The form factor of disk drive 11 is the volume enclosed by disk drive enclosure 13 plus the volume between enclosure skirts 19. Any components necessary to the proper operation of disk drive 11 should fit within these form factor dimensions, but most prior art has been unable to meet this goal.

Figure 2:
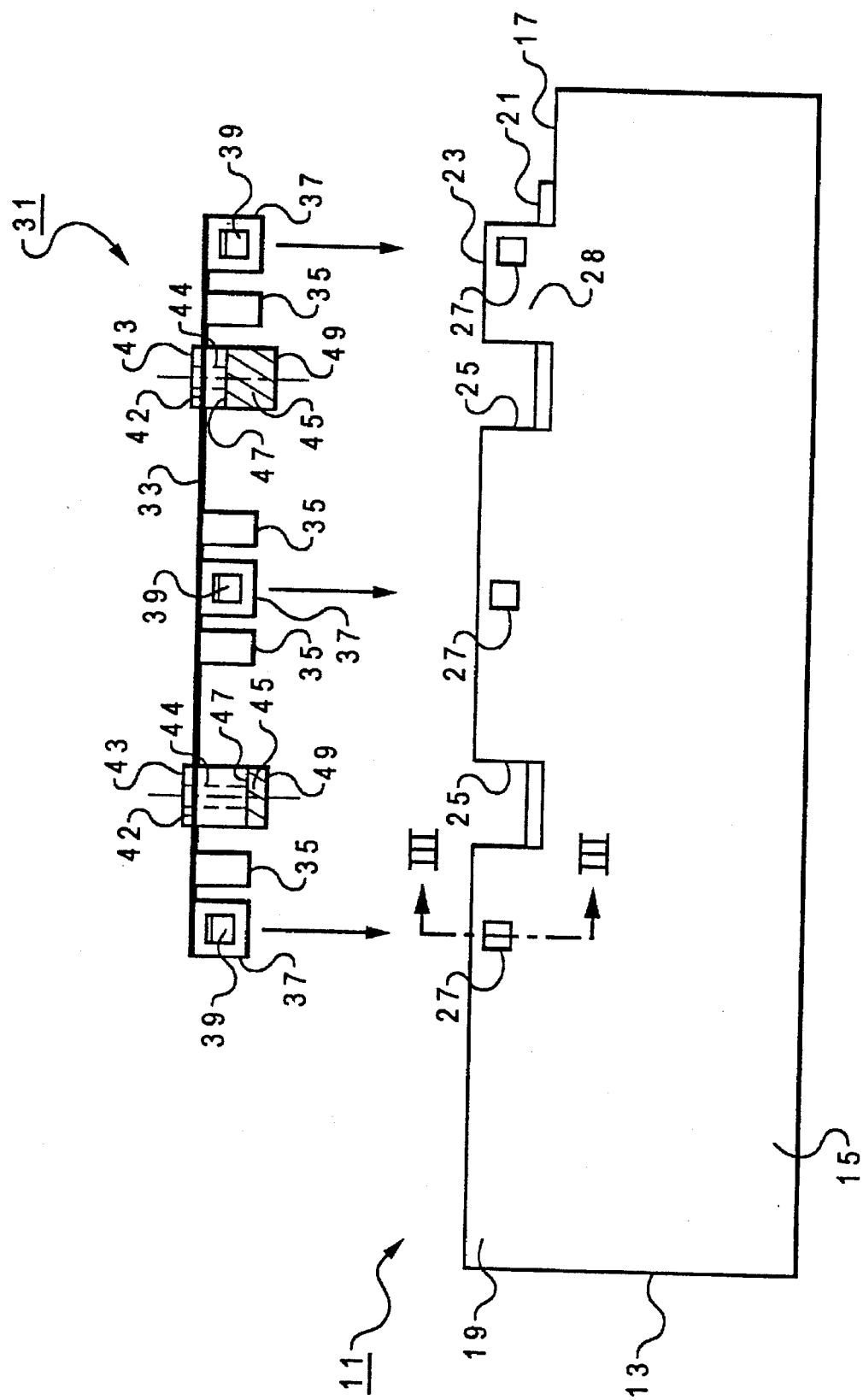
FIG. 2 is an exploded side elevational view of the vibration isolator and computer hard disk drive shown in FIG. 1.

FIGS. 1 and 2 show that each enclosure skirt 19 in the preferred embodiment has a free edge 23, two slots 25, and three recesses 27. Each free edge 23 is a thin flat surface located in an X-Y plane parallel to top face 17. Each slot 25 is generally rectangular in shape and is formed in enclosure skirt 19 from free edge 23 down to the top face 17 of disk drive enclosure 13. The two slots 25 essentially divide each enclosure skirt 19 into three sections and one rectangular recess or hole 27 is formed in each of these sections, leading from an outer side 28 of enclosure skirt 19 to an inner side 29. Enclosure skirts 19 may also have additional mounting holes for further securing disk drive 11 to a computer, but these are not shown because they do not affect this invention.

FIGS. 1, 2, and 4 illustrate the isolator mounting system 31 of the present invention. One isolator 31 is mounted on each enclosure skirt 19. The body of isolator 31 comprises a flexible strip 33 of resilient metal that is thin and flat and provides spring action to isolator 31. As shown in FIGS. 1, 2, and 3, flexible strip 33 overlies the free edge 23 of enclosure skirt 19 and extends across each slot 25 of enclosure skirt 19. Each flexible strip 33 is substantially rigid in the X-Y plane, but is flexible along the Z-axis. The Z-axis is a "device sensitive" axis, meaning that disk drive 11 is especially sensitive to vibrations and impacts in a Z-direction. Accordingly, the preferred embodiment of the present invention provides isolation along the Z-axis, but not in the X-Y plane.

FIGS. 1–4 show that isolator 31 is retained relative to enclosure skirt 19 by inner retaining tabs 35 and outer retaining tabs 37 depending downward from flexible strip 33. In the preferred embodiment, each enclosure skirt 19 has four inner retaining tabs 35 depending downward from flexible strip 33 and in contact with the inner side 29 of enclosure skirt 19. Each enclosure skirt 19 also has three outer retaining tabs 37 depending downward from flexible strip 33 and in contact with the outer side 28 of enclosure skirt 19, located such that each outer retaining tab 37 covers one of the recesses 27 in enclosure skirt 19, as shown in FIG. 2. In this manner, retaining tabs 35, 37 retain isolator 31 relative to enclosure skirt 19 horizontally along the Y-axis. To simplify fabrication of isolator 31, all retaining tabs 35, 37 are staggered relative to each other such that no two are aligned, as shown in FIGS. 2 and 4.

As shown in FIG. 3, there is a spring clip 39 formed in a central portion of each outer retaining tab 37. Spring clip 39 is formed by cutting an inverted U-shape in outer retaining tab 37 and bending the upper edge 41 of spring clip 39 toward inner retaining tab 37. When isolator 31 is being mounted on enclosure skirt 19, spring clip 39 provides very little resistance because upper edge 41 is forced outward by enclosure skirt 19 until it is substantially parallel with outer retaining tab 37. Once isolator 31 is properly located on enclosure skirt 19, the upper edge 41 of spring clip 39 returns to its rest position such that it is bent toward inner retaining tab 35 and extends into the recess 27 of enclosure skirt 19. Spring clip 39 retains isolator 31 relative to enclosure skirt 19 vertically along the Z-axis because the upper edge 41 of clip 39 contacts the upper edge of recess 27 and horizontally along the X-axis because the side edges of spring clip 39 contact the sides of recess 27.

FIGS. 1, 2, and 4 show that two mounting nuts 43 are rigidly attached to each flexible strip 33 such that each nut 43 is located within a slot 25 when isolator 31 is mounted to enclosure skirt 19. Each mounting nut 43 extends through an aperture 42 provided in flexible strip 33. Mounting nuts 43 have internal threaded sockets 44 for receiving a fastener 46 to attach disk drive enclosure 13 to an external frame (not shown) that secures to the body of the computer. When attached to the external frame, disk drive 11 is thereby attached to the body of the computer because disk drive 11 is attached to isolator 31 by retaining tabs 35, 37 and spring clips 39. Isolator 31 is attached to the external frame by mounting nuts 43, and the external frame is attached to the body of the computer. In the preferred embodiment shown in FIG. 4, the width of flexible strip 33 increases in the region where mounting nut 43 is attached such that mounting nut 43 can have a diameter greater than the uniform width of flexible strip 33 while still receiving sufficient support. Mounting nut 43 moves in unison with any flexing of flexible strip 33 in the Z-direction.

Also shown in FIGS. 1–4 are the dampening members 45 for isolating the movement of disk drive 11 relative to the rest of the computer. Dampening members 45 are preferably made of elastomeric material, are generally cylindrical in shape, and have a top portion 47 and a bottom portion 49. The top portion 47 of each one of the dampening members 45 is bonded to one of the mounting nuts 43 such that dampening member 45 is positioned inside a slot 25 of enclosure skirt 19, and the bottom portion 49 of dampening member 45 contacts the top face 17 of disk drive enclosure 13.

In operation, the body of the computer is subjected to various mechanical vibrations and impact loads. These vibrations and impacts are transferred from the body of the computer to the external frame to which isolator 31 is attached. The combination of the spring action of flexible strip 33 and the vibration dampening effects of dampening member 45 work to substantially isolate or deaden the movement of disk drive 11 relative to the body of the computer along the "device sensitive" Z-axis. In other words, the mechanical vibrations and impacts experienced by the rest of the computer along the Z-axis are substantially eliminated or at least weakened before reaching disk drive 11. Flexible strip 33 allows movement of disk drive enclosure 13 relative to mounting nut 43 in the Z-direction, this movement being dampened by dampening member 45. Flexible strip 33, however, prevents any lateral movement of disk drive enclosure 13 in the X-Y plane relative to mounting nut 43. The thickness of each dampening member 45 from top portion 47 to bottom portion 49 determines the stiffness of isolator 31 at each slot 25. By varying this thickness at each slot 25, the balance of isolator 31 can be improved. An ideally balanced isolator 31 has an isolator elastic center aligned with the center of gravity of disk drive 11, thus decoupling translation and rotation of isolator 31 relative to disk drive 11.

There are several advantages of the present invention over the prior art. The primary advantage is the minimal amount of space required to accommodate the isolator mounting system. Unlike the prior art, this isolator system fits within the standardized form factor of modern hard disk drives and therefore allows more space to be utilized for additional information storage capacity or various other components. Also, the present invention provides isolation along the "device sensitive" Z-axis while maintaining high stiffness along the X-axis and Y-axis where isolation could actually decrease performance of the disk drive. Finally, this isolator system provides for several dampening members whose stiffnesses may be manipulated, thus allowing improved balance of the isolator system relative to the disk drive.

While the invention has been shown in only some of its forms, it should be apparent to those skilled in the art that it is not so limited but is susceptible to various changes without departing from the scope of the invention.

What is claimed is:

1. A magnetic disk apparatus comprising:

a disk drive enclosure having two side walls and a face;

the side walls of the disk drive enclosure extending beyond the face of the disk drive enclosure and forming two enclosure skirts, each enclosure skirt having a free edge and two side surfaces, the free edge being in an X-Y plane which is perpendicular to the side surfaces of the enclosure skirt and parallel to the face of the disk drive enclosure;

each enclosure skirt having at least one slot extending from the free edge of the enclosure skirt to the face of the disk drive enclosure;

a thin, flat flexible strip mounted to each of the enclosure skirts in overlying contact with the free edge and extending across the slot, each of the strips being flexible in a Z-axis direction perpendicular to the X-Y plane;

each of the flexible strips having an aperture centered over one of the slots;

a mounting member located within one of the slots of each of the enclosure skirts and aligned with the aperture in the flexible strip, the mounting member having one end attached to the flexible strip and another end contacting the face of the disk drive enclosure, the mounting member having a dampening portion formed of a dampening material for dampening movement of the disk drive enclosure in a Z-axis direction relative to an external frame; and a fastener which inserts through the flexible strip and attaches to the mounting member to secure the disk drive enclosure and the magnetic disk drive mechanism to an external frame.

2. A magnetic disk apparatus according to claim 1, wherein at least two retaining tabs depend downward from each flexible strip for securing each strip to one of the enclosure skirts.

3. A magnetic disk apparatus according to claim 2, wherein at least one of the retaining tabs on each flexible strip is located adjacent to each of the side surfaces of each enclosure skirt.

4. A magnetic disk apparatus according to claim 1, wherein:

a plurality of retaining tabs are located on each of the side surfaces of each enclosure skirt and depend downward from each flexible strip; and wherein each of the retaining tabs on each side surface of the enclosure skirt is staggered from each of the retaining tabs on an opposite side surface of the enclosure skirt.

5. A magnetic disk apparatus according to claim 1, wherein:

each enclosure skirt has at least one recess formed in one of the side surfaces;

at least one retaining tab depends downward from each flexible strip; and wherein each retaining tab has a spring clip extending into the recess in the enclosure skirt to mount the flexible strip to the skirt.

6. A magnetic disk apparatus according to claim 1, wherein each flexible strip is substantially rigid in the X-Y plane.

7. A magnetic disk apparatus according to claim 1, wherein each enclosure skirt has two slots extending from the free edge of the enclosure skirt to the face of the disk drive enclosure.

8. A magnetic disk apparatus according to claim 1, wherein the mounting member has a threaded socket for receiving the fastener.

9. A magnetic disk apparatus comprising:

a disk drive enclosure having two side walls and a face;

the side walls of the disk drive enclosure extending beyond the face of the disk drive enclosure and forming two enclosure skirts, each enclosure skirt having a free edge and a selected thickness, the free edge being in an X-Y plane which is perpendicular to the side walls of the disk drive enclosure and parallel to the face of the disk drive enclosure;

each enclosure skirt having two slots extending from the free edge of the enclosure skirt to the face of the disk drive enclosure;

each enclosure skirt having at least one recess and each recess having an upper edge;

two thin, flat flexible strips, one mounted to each of the enclosure skirts in overlying contact with the free edge and extending across each slot, each of the strips being substantially rigid in the X-Y plane and flexible in a Z-axis direction perpendicular to the X-Y plane;

each of the flexible strips having an inner edge and an outer edge;

at least one inner retaining tab depending downward from the inner edge of the flexible strip and at least one outer retaining tab depending downward from the outer edge of the flexible strip;

at least one of the inner and outer retaining tabs having a spring clip extending into one of the recesses in the enclosure skirt to secure the flexible strip to the enclosure skirt;

each of the flexible strips having an aperture centered over one of the slots;

at least one mounting nut attached to each of the flexible strips for securing the flexible strip to an external frame, each mounting nut inserted through one of the apertures over one of the slots, each mounting nut having internal threads leading from the top side to the bottom side; and at least one dampening member, each joined to one of the mounting nuts within one of the slots and having one end contacting the face of the disk drive enclosure, wherein the dampening members dampen movement of the disk drive enclosure in the Z-axis direction relative to the external frame.

10. A magnetic disk apparatus according to claim 9, wherein each one of the inner retaining tabs depending downward from the inner edge of the flexible strip is staggered from each one of the outer retaining tabs depending downward from the outer edge of the flexible strip.

* * * * *

UNITED STATES PATENT AND TRADEMARK OFFICE
CERTIFICATE OF CORRECTION

PATENT NO.      : 5,654,875
DATED           : August 5, 1997
INVENTOR(S)     : Drew B. Lawson Page 1 of 1

It is certified that error appears in the above-identified patent and that said Letters Patent is hereby corrected as shown below:

Title page, item [73],
Assignee,
-- Add the Assignee: International Business Machines Corporation --.

Signed and Sealed this

Second Day of October, 2001

*Attest:*

*Attesting Officer*

NICHOLAS P. GODICI
*Acting Director of the United States Patent and Trademark Office*